United States Patent

Lin et al.

[11] Patent Number: 5,586,406
[45] Date of Patent: Dec. 24, 1996

[54] LIVE BAIT CONTAINER

[76] Inventors: Yong F. Lin, No. 827, Twu Chen Rd.; Yong C. Lin, No. 853, Twu Chen Rd., both of Tali City, Taichung Hsien, Taiwan

[21] Appl. No.: 563,339

[22] Filed: Nov. 28, 1995

[51] Int. Cl.⁶ .................................................. A01K 97/04
[52] U.S. Cl. ....................................... 43/55; 43/56
[58] Field of Search ........................... 43/54.1, 55, 56; 261/121.2

[56] References Cited

U.S. PATENT DOCUMENTS

| | | | |
|---|---|---|---|
| 3,380,186 | 4/1968 | Donner | 43/56 |
| 3,955,306 | 5/1976 | Handa | 43/56 |
| 4,763,438 | 8/1988 | Saliaris | 43/56 |

*Primary Examiner*—Jeanne M. Elpel
*Attorney, Agent, or Firm*—Bacon & Thomas

[57] ABSTRACT

A live bait container including a container body with air vents for keeping live baits; a cover covered on the container body by a screw joint, the cover having a bait outlet and a bait inlet spaced on the periphery, a bait passage way connected between the bait outlet and the bait inlet at an outer side, a plurality of raised portions raised from the inside wall opposite to the bait passage way, and a spiral track spirally extending downwards from said bait outlet for guiding live baits from the container body to the bait passage way; a locating board mounted on the cover, having a peripheral flange covered over the bait passage way, and a plurality of holes through the peripheral flange; and a rotary cap covered on the locating board, having an inside recess forced into engagement with one raised portion of the cover, and a through hole through the periphery; wherein the rotary cap can be turned between the operative position in which the through hole of the rotary cap is aligned with one through hole of the locating board for permitting a fishhook to be inserted into the bait passage way to pick up live baits from the bait passage way, and the non-operative position in which the through hole of the rotary cap is closed by the periphery of the locating board to prevent escape of live baits.

5 Claims, 4 Drawing Sheets

LIVE BAIT CONTAINER

BACKGROUND OF THE INVENTION

The present invention relates to bait containers, and relates more particularly to a live bait container which is comprised of a container body, a cover covered on the container body, a rotary cap covered on the cover, and a locating board retained on the inside between the cover and the rotary cap. The rotary cap can be turned between the operative position in which a through hole on the rotary cap is opened for permitting a fishhook to be inserted into a bait passage way to pick up live baits, and the non-operative in which the through hole of the rotary cap is closed to prevent escape of live baits.

Fishing is a kind of activity suitable for people of all ages. For a bait fishing, a live bait container shall be used to keep live baits alive. FIG. 1 shows a conventional live bait container for this purpose. This live bait container is comprised of a container body A and a cover B. The container body A and the cover B are injection-molded from plastics. The container body A comprises a hanger A1 at the front side for hanging on the belt, an open chamber A2 for keeping live baits, and a retaining recess A3 on the inside adjacent to the hanger A1. The cover B comprises a hinge D at the back side connected to the container body A, a plurality of air vents B1, and a spring clip fastener C at the front side for fastening to the retaining recess A3 to hold the cover B in the closed position. The hinge D has a longitudinal bending hole D1 through which the hinge D can be turned inwards and outwards. When the spring clip fastener C is bent inwards and lifted from the retaining recess A3, the cover B is opened. This structure of live bait container is still not satisfactory in function. The drawbacks of this structure of live bait container are numerous and outlined hereinafter.

1) When live baits are taken out of the container body A with a wet hand, they cannot be put back into the container body. If live baits are wetted, they will die quickly. Furthermore, it is not hygienic to pick up live baits with the hand.

2) Because live baits are picked up from the container body with the hand and then fastened to the fishhook, the user's hand tends to be injured when fastening live baits to the fishhook.

3) Because the air vents B1 are disposed above the open chamber A2 of the container body A and not protected by a shielding means when the cover B is closed, rainwater or liquid tends to drop to the open chamber A2 of the container body A to wet live baits.

4) Because the cover B is frequently opened and closed during fishing, the hinge D will be damaged with use quickly.

5) The container body A tends to fall to the ground when it is fastened to the user's belt through the hanger A1.

6) The limited space of the open chamber A2 is available for keeping a limited number of live baits, and the user may have to prepare several live bait containers for each fishing trip.

SUMMARY OF THE INVENTION

The present invention has been accomplished to provide a live bait container which eliminates the aforesaid drawbacks.

According to one aspect of the present invention, the live bait container comprises a container body for keeping live baits, the container body comprising an outer thread around the periphery at one end, a downward bottom flange around the periphery at an opposite end, and an inner thread around the downward bottom flange; a cover covered on the container body to close the bait chamber, the cover comprising an inner thread threaded onto the outer thread of the container body, a bait outlet and a bait inlet spaced on the periphery, a bait passage way connected between the bait outlet and the bait inlet at an outer side, a plurality of raised portions raised from the inside opposite to the bait passage way, and a spiral track spirally extending downwards from the bait outlet for guiding live baits from the bait chamber to the bait passage way; a locating board mounted on the cover, the locating board comprising a peripheral flange covered over the bait passage way, and a plurality of holes through the peripheral flange; and a rotary cap covered on the locating board, having an inside recess forced into engagement with one raised portion of the cover, and a through hole through the periphery, the rotary cap being turned relative to the locating board between the operative position in which the through hole of the rotary cap is disposed in alignment with one through hole on the locating board for permitting a fishhook to be inserted into the bait passage way to pick up live baits from the bait passage way, and the non-operative position in which the through hole of the rotary cap is closed by the periphery of the locating board to prevent escape of live baits.

According to another aspect of the present invention, the number of the holes on the peripheral flange of the locating board and the pitch therebetween are equal to that of the raised portions of the cover, therefore when the inside recess of the rotary cap is shifted from one raised portion of the cover to another, the through hole of the rotary cap is shifted from one hole of the locating board to another.

According to still another aspect of the present invention, the container body comprises an outward flange sloping downwardly outwards around the periphery near the outer thread of the container body, and a plurality of air vents sloping downwardly inwards around the outward flange for guiding outside air into the bait chamber.

According to still another aspect of the present invention, the outer thread of the container body matches the inner thread of the downward bottom flange thereof so that two container bodies of the same structure can be connected in a stack by threading the outer thread of one container body into the inner thread of the other.

According to a yet further aspect of the present invention, the rotary cap comprises a hanger means at the center for hanging, and a plurality of anti-skid lines around the periphery.

DETAILED DESCRIPTION OF THE PREFERRED EMBODIMENT

Figure 1:
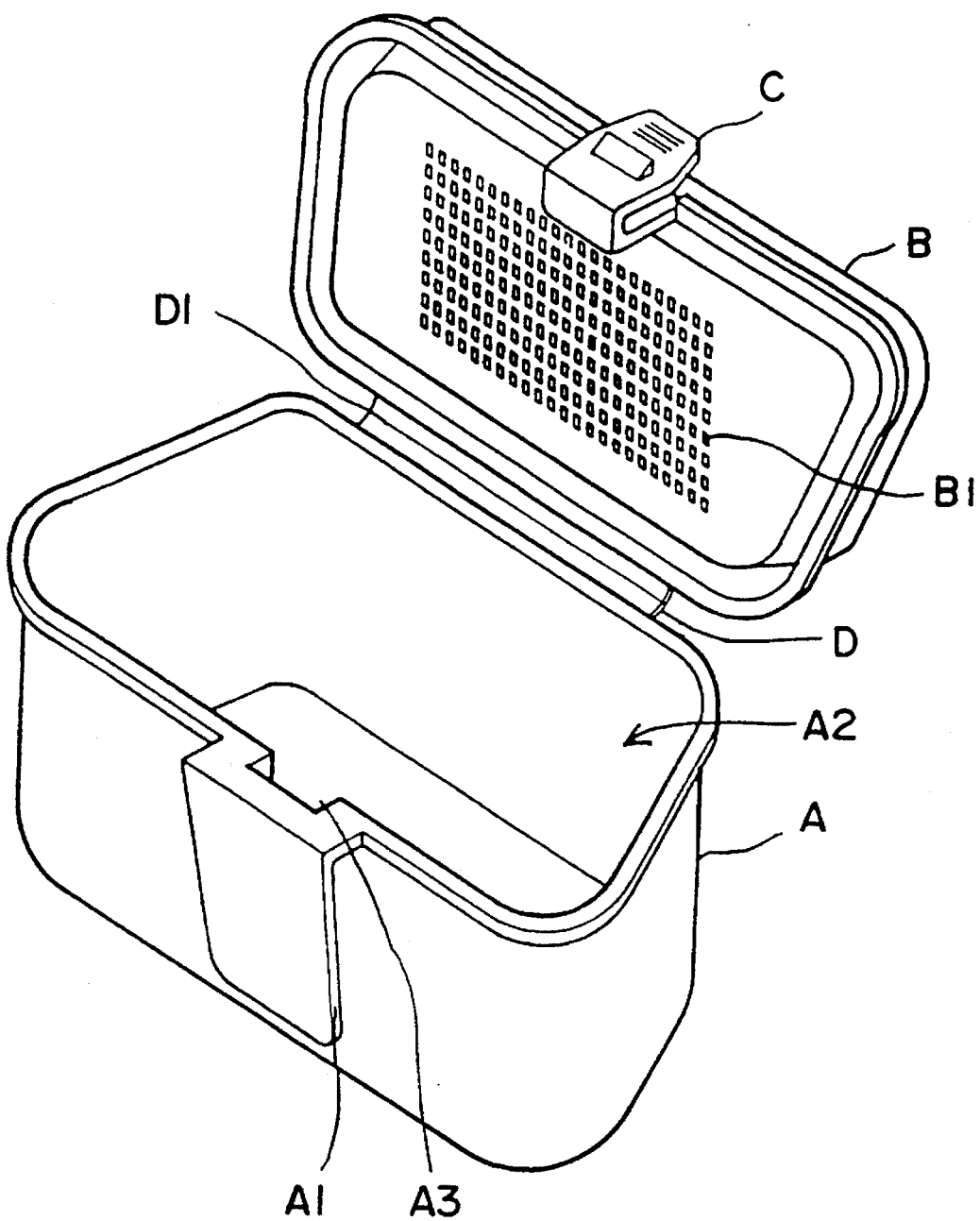
FIG. 1 is an elevational view of a live bait container according to the prior art.
Figure 2:
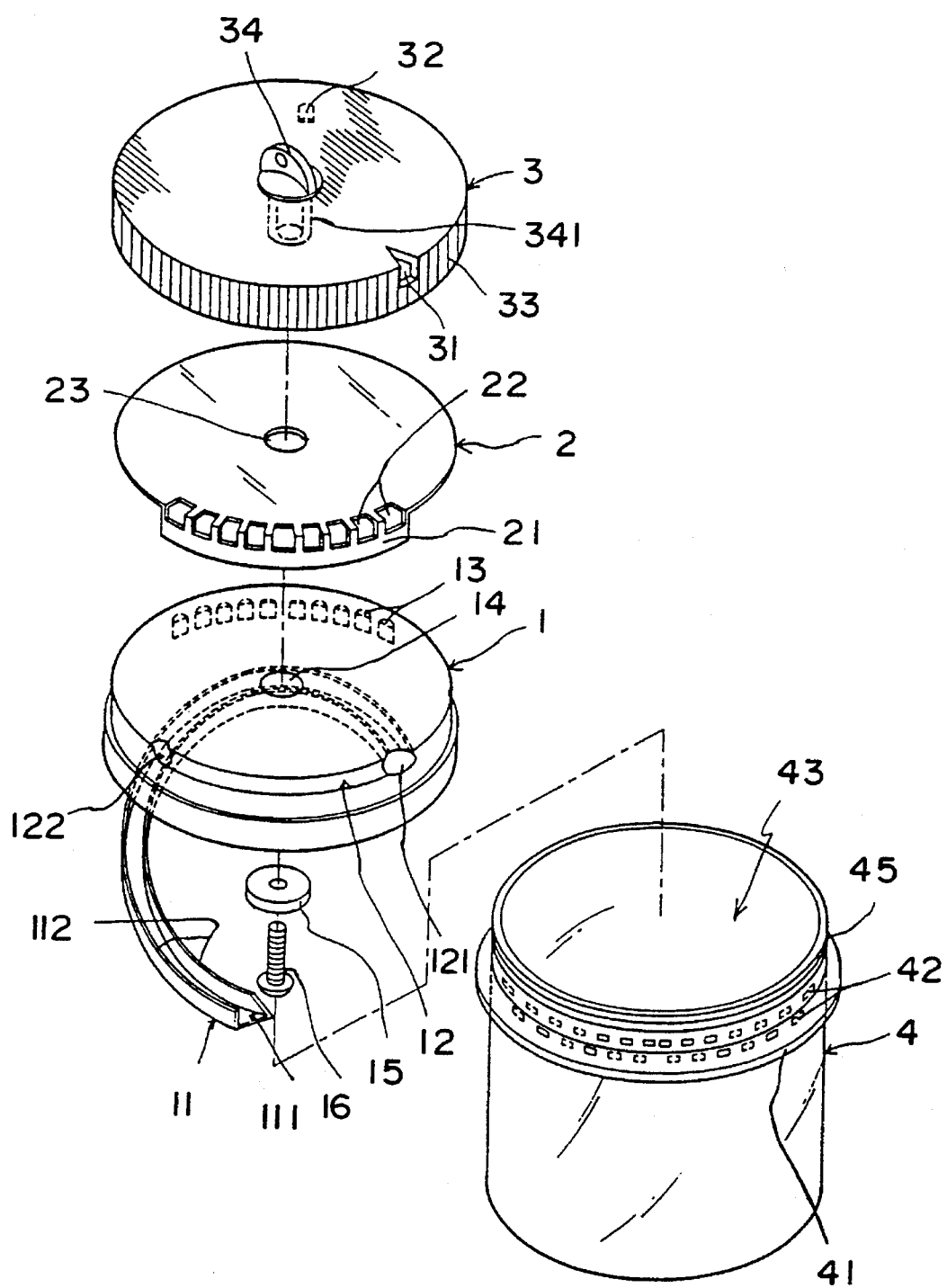
FIG. 2 is an exploded view of a live bait container according to the present invention.

Referring to FIG. 2, a live bait container in accordance with the present invention is generally comprised of a rotary cap 3, a locating board 2, a cover 1, and a container body 4. The rotary cap 3 comprises a through hole 31 through the periphery, a locating recess 32 on the inside opposite to the through hole 31, a hanger means 34 at the center having a bottom female screw 341, and anti-skid lines 33 around the periphery. The locating board 2 comprises a center through hole 23, which receives the bottom female screw 341 of the rotary cap 3, a peripheral flange 21, and a plurality of holes 22 through the connection area between the locating board 2 and the peripheral flange 21. The cover 1 comprises a center through hole 14, which receives the bottom female screw 341 of the rotary cap 3, a bait outlet 121 and a bait inlet 122 spaced on the periphery, a bait passage way 12 on the outside wall connected between the bait outlet 121 and the bait inlet 122, a plurality of raised portions 13 raised from the inside wall opposite to the bait passage way 12 corresponding to the holes 22 of the locating board 2, and a spiral track 11 spirally extending downwards from the bait outlet 121. The spiral track 11 comprises two vertical side walls 112 defining a spiral groove 111. Furthermore, the cover 1 is internally threaded for connection to the container body 4. The container body 4 comprises an outer thread 45 at the top, a bait chamber 43, an outward flange 41 sloping downwardly outwards around the periphery near the outer thread 45, a plurality of air vents 42 sloping downwardly inwards around the outward flange 41, a downward flange 44 around the bottom end, and an inner thread 441 around the downward flange 44.

Figure 3:
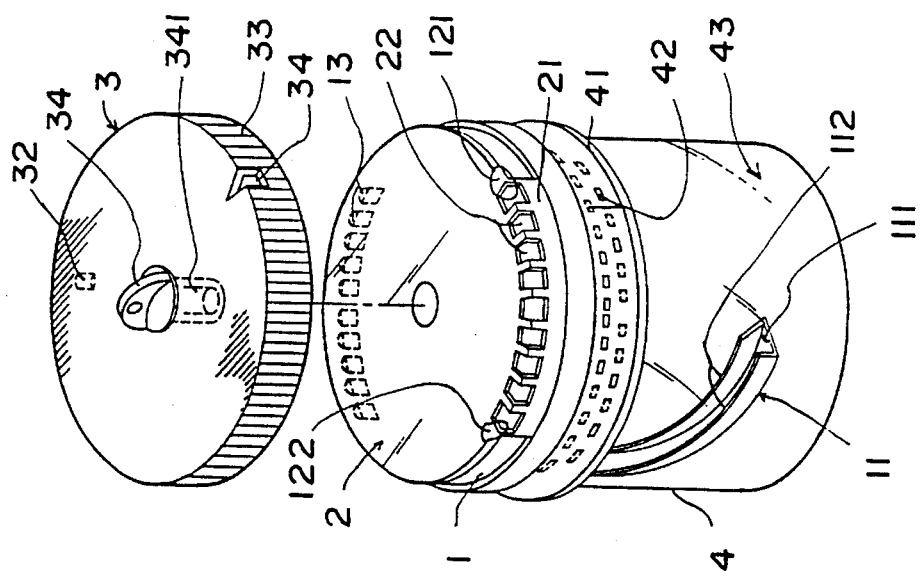
FIG. 3 is a perspective assembly view of the live bait container shown in FIG. 2.
Figure 4:
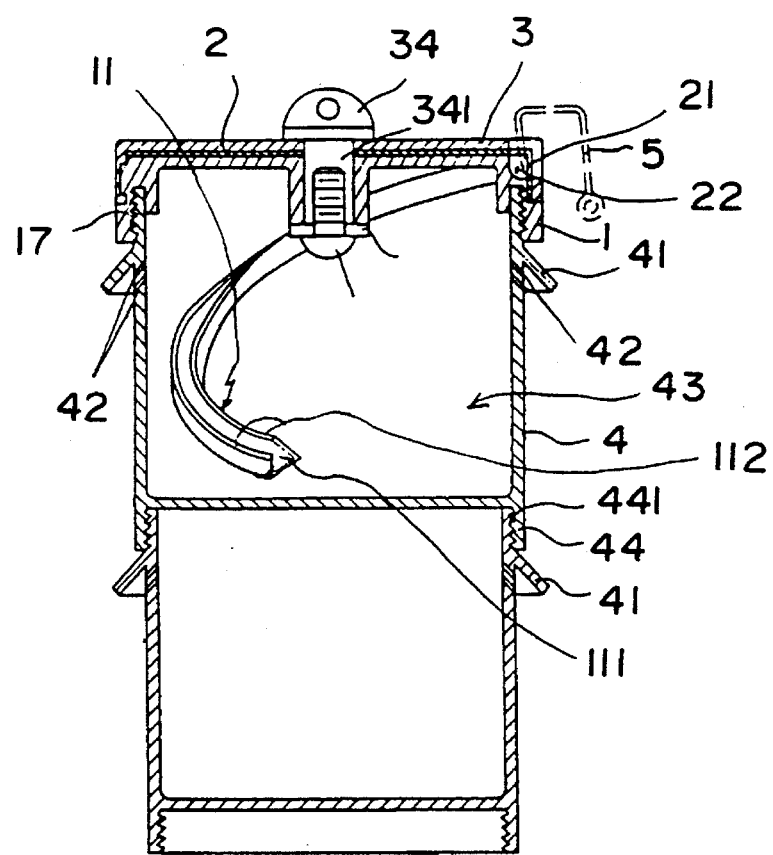
FIG. 4 is a sectional view showing two container bodies connected in a stack according to the present invention.

Referring to FIGS. 3 and 4, when the locating board 2 is placed on the cover 1, the peripheral flange 21 is covered over the bait passage way 12, and the rotary cap 3 is covered on the locating board 2. Through the holes 22, the user can pick up live baits from the bait passage way 12. The locating board 2 separates live baits from the rotary cap 3 so that the live baits are not injured when the rotary cap 3 is rotated. When the rotary cap 3 is covered on the locating board 2, the bottom female screw 341 is inserted into the center through hole 23 of the locating board 2 and the center through hole 14 of the cover 1, and then a screw 16 is inserted through a washer 15 and then threaded into the bottom female screw 341 of the hanger means 34 to fix the cover 1 and the locating board 2 to the rotary cap 3. When assembled, the through hole 31 of the rotary cap 3 is disposed in alignment with one hole 22 of the locating board 2, and the locating recess 32 is forced into engagement with one raised portion 13. Then, the cover 1 is threaded onto the outer thread 45 of the container body 4. When in use, live baits are put in the live bait container 43.

Figure 5:
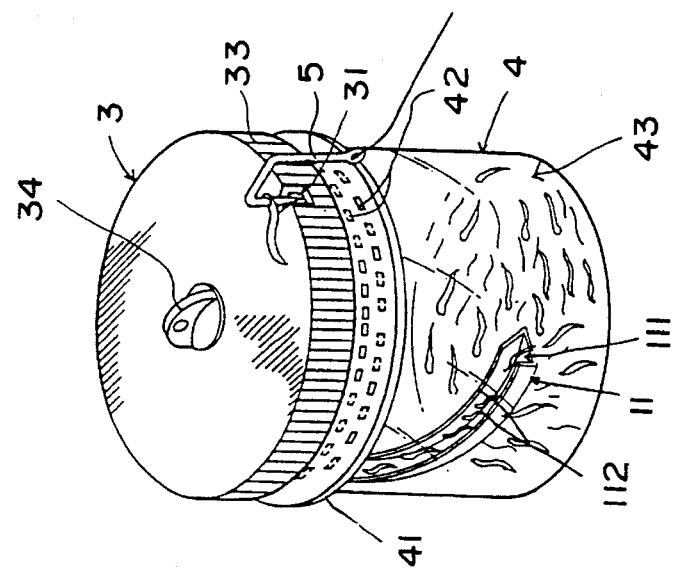
FIG. 5 shows live baits received in the live bait container shown in FIG. 2.
Figure 6:
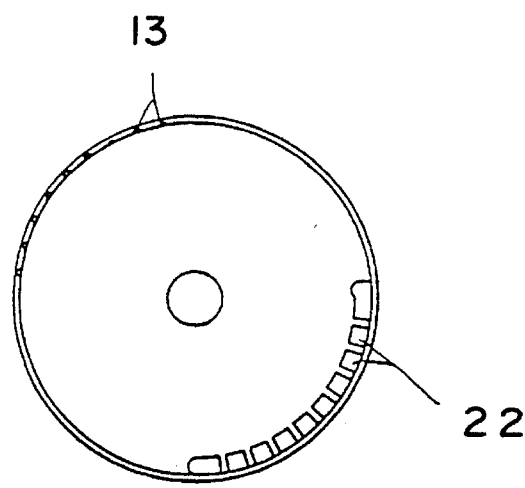
FIG. 6 is a top view showing the locating board covered on the cover according to the present invention.

Referring to FIGS. 5 and 6, when the rotary cap 3 is turned relative to the locating board 2 to move the through hole 31 away from the holes 22 of the locating board 2, live baits are prohibited from escaping out of the rotary cap 3. If live baits creep upwards along the spiral groove 111, they will move out of the bait outlet 121 to the bait passage way 12 and then fall to the bait chamber 43 again through the bait inlet 122. If the through hole 31 is moved into aligned with one hole 22 on the locating board 2, a fishhook 5 can be inserted through the through hole 31 of the rotary cap 3 and one hole 22 of the locating board 2 to pick up baits from the bait passage way 12. Because the pitch between the raised portions 13 is equal to the pitch between the holes 22, when the rotary cap 3 is turned forwards for one step to shift the locating recess 32 from one raised portion 13 to a next one, the through hole 31 is shifted from one hole 22 to another.

Referring to FIG. 4 again, two container bodies 4 can be connected in a stack by threading the outer thread 45 of a first container body 4 into the inner thread 441 of the downward flange 44 of a second container body 4.

It is to be understood that the drawings are designed for purposes of illustration only, and are not intended as a definition of the limits and scope of the invention disclosed.

We claim:

1. A live bait container comprising:
   a container body for keeping live baits, the container body comprising an outer thread around the periphery at one end, a downward bottom flange around the periphery at an opposite end, and an inner thread around said downward bottom flange;
   a cover covered on said container body to close said bait chamber, said cover comprising an inner thread threaded onto the outer thread of said container body, a bait outlet and a bait inlet spaced on the periphery, a bait passage way connected between said bait outlet and said bait inlet at an outer side, a plurality of raised portions raised from the inside opposite to said bait passage way, and a spiral track spirally extending downwards from said bait outlet for guiding live baits from said bait chamber to said bait passage way;
   a locating board mounted on said cover, said locating board comprising a peripheral flange covered over said bait passage way, and a plurality of holes through said peripheral flange; and
   a rotary cap covered on said locating board, having an inside recess forced into engagement with one raised portion of said cover, and a through hole through the periphery, said rotary cap being turned relative to said locating board between the operative position in which the through hole of said rotary cap is disposed in alignment with one through hole on said locating board for permitting a fishhook to be inserted into said bait passage way to pick up live baits from said bait passage way, and the non-operative position in which the through hole of said rotary cap is closed by the periphery of said locating board to prevent escape of live baits.

2. The live bait container of claim 1 wherein the number of the holes on the peripheral flange of said locating board and the pitch therebetween are equal to that of the raised portions of said cover.

3. The live bait container of claim 1 wherein said container body comprises an outward flange sloping downwardly outwards around the periphery near the outer thread of said container body, and a plurality of air vents sloping downwardly inwards around said outward flange for guiding outside air into said bait chamber.

4. The live bait container of claim 1 wherein the outer thread of said container body matches the inner thread of the downward bottom flange thereof so that two container bodies of the same structure can be connected in a stack by threading the outer thread of one container body into the inner thread of the other.

5. The live bait container of claim 1 wherein said rotary cap comprises a hanger means at the center for hanging, and a plurality of anti-skid lines around the periphery.

* * * * *